(12) United States Patent
Schoppmeier

(10) Patent No.: US 8,971,390 B2
(45) Date of Patent: Mar. 3, 2015

(54) POWER SAVING IN A COMMUNICATION DEVICE

(75) Inventor: Dietmar Schoppmeier, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 960 days.

(21) Appl. No.: 12/814,838

(22) Filed: Jun. 14, 2010

(65) Prior Publication Data

US 2010/0316103 A1 Dec. 16, 2010

Related U.S. Application Data

(60) Provisional application No. 61/187,214, filed on Jun. 15, 2009.

(51) Int. Cl.
*H04B 1/38* (2006.01)
*H04M 11/06* (2006.01)

(52) U.S. Cl.
CPC ............ *H04M 11/062* (2013.01); *Y02B 60/36* (2013.01)
USPC ...................................... 375/220; 370/236.2

(58) Field of Classification Search
USPC .............. 370/236.2, 352, 386, 388, 389, 392, 370/400, 401; 375/219, 220, 222, 377
See application file for complete search history.

(56) References Cited

U.S. PATENT DOCUMENTS

| | | | | |
|---|---|---|---|---|
| 5,903,559 | A * | 5/1999 | Acharya et al. | 370/355 |
| 6,721,355 | B1 * | 4/2004 | McClennon et al. | 375/222 |
| 7,142,591 | B2 * | 11/2006 | Kelliher | 375/222 |
| 7,630,639 | B2 * | 12/2009 | Kramer et al. | 398/72 |
| 2004/0184407 | A1 * | 9/2004 | Pok et al. | 370/236 |
| 2004/0184408 | A1 * | 9/2004 | Liu et al. | 370/236 |
| 2008/0260011 | A1 * | 10/2008 | Peeters et al. | 375/222 |
| 2009/0022213 | A1 * | 1/2009 | Shi | 375/219 |

* cited by examiner

*Primary Examiner* — Curtis A Alia
(74) *Attorney, Agent, or Firm* — Murphy, Bilak & Homiller, PLLC

(57) ABSTRACT

A communication device includes an application data interface, a first communication layer and a physical media interface. The first communication layer includes a first entity configured to process application data and a second entity configured to process operations, administrations and maintenance data. The communication device further includes a switching device. In a first power mode, the switching device couples the application data interface to the first entity of the first communication layer. In a second power mode, the switching device couples the application data interface to the second entity of the first communication layer.

24 Claims, 5 Drawing Sheets

POWER SAVING IN A COMMUNICATION DEVICE

PRIORITY CLAIM

This application claims the benefit of U.S. Provisional Application No. 61/187,214 filed on 15 Jun. 2009, which is incorporated herein by reference in its entirety.

FIELD OF THE INVENTION

The present invention relates to devices and methods supporting power saving in a communication device.

BACKGROUND

In communication devices, such as DSL transceivers (DSL: Digital Subscriber Line), it is known to use different power modes so as to allow for power saving in a situation in which not the full capacity of the transceiver is used. For example, according to the ADSL2 specification (ADSL: Asymmetric Digital Subscriber Line) ITU-T G.992.3, three different power modes are known which are referred to as L0, L2, and L3. In the L0 state, the transceiver is operated "full on", i.e. operating parameters of the transceiver are adjusted in accordance with a maximum allowable bitrate. The maximum allowable bitrate may be limited by the capabilities of the transceiver, by characteristics of a physical communication media connected to the transceiver, or by policies of the network operator. In the L2 state, the operating parameters of the transceiver are adjusted so as to reduce the bitrate as compared to the L0 state. In the L3 state, also referred to as idle state, the transceiver is powered down, which means that data communication is not possible in this state.

According to some applications using DSL communication links, it is desirable that a DSL transceiver is permanently powered on. For example, this may be the case when using VoIP services (VoIP: Voice Over Internet Protocol). Namely, when powering down a DSL transceiver of a subscriber using VoIP services, this subscriber can no longer be reached by a VoIP call. Accordingly, the L3 power mode is not appropriate for some applications. In turn, the L2 power mode is available only in a downstream direction, i.e. in a direction from the network to the subscriber. Moreover, since the L2 power mode involves a reduction of the bitrate, it at the same time also results in increased delays of communicated data. Again, for some applications such as VoIP services, excessive delays are not desirable and therefore, the power saving capabilities of the L2 power mode cannot be fully exploited.

In view of the above, there is a need for efficient power saving techniques in communication devices.

SUMMARY

According to one embodiment of the invention, a communication device is provided. The communication device comprises an application data interface, a first communication layer, and a physical media interface. The first communication layer comprises a first entity configured to process application data and a second entity configured to process operations, administrations and maintenance data. The physical media interface is configured to communicate a communication signal with the application data and/or the operations, administrations and maintenance data with respect to a physical media. The communication device further comprises a switching device. In a first power mode, the switching device couples the application data interface to the first entity. In a second power mode, the switching device couples the application data interface to the second entity.

According to other embodiments, further communication devices or methods of power saving in a communication device are provided.

Those skilled in the art will recognize additional features and advantages upon reading the following detailed description, and upon viewing the accompanying drawings.

DETAILED DESCRIPTION OF THE EMBODIMENTS

In the following, embodiments of the invention will be explained in more detail and with reference to the accompanying drawings. It is to be understood that the description is not to be taken in a limiting sense, but is made only for the purpose of illustrating the general principles of the invention. Further, it is to be understood the scope of the invention is only defined by the claims and is not intended to be limited by the embodiments and examples described hereinafter.

Throughout the description and the drawings, similar or corresponding components are designated by the same reference 1. Here, it is to be understood that the described and illustrated structures are merely illustrative and schematic and that any shown or described direct connection or coupling between two functional blocks, entities, devices, components, or other physical or functional elements could also be implemented by indirect connection or coupling. Further, it is to be understood that components of the illustrated embodiments may be implemented either by dedicated hardware or by software to be executed by a processor.

The embodiments as described hereinafter relate to power saving techniques in a communication device, e.g. in a DSL transceiver. The communication devices as explained in the following may be implemented on the basis of a single integrated circuit, i.e. may be implemented as a single communication chip. However, it is to be understood that communication devices according to embodiments of the invention may also be implemented using multiple integrated circuits.

Figure 1:
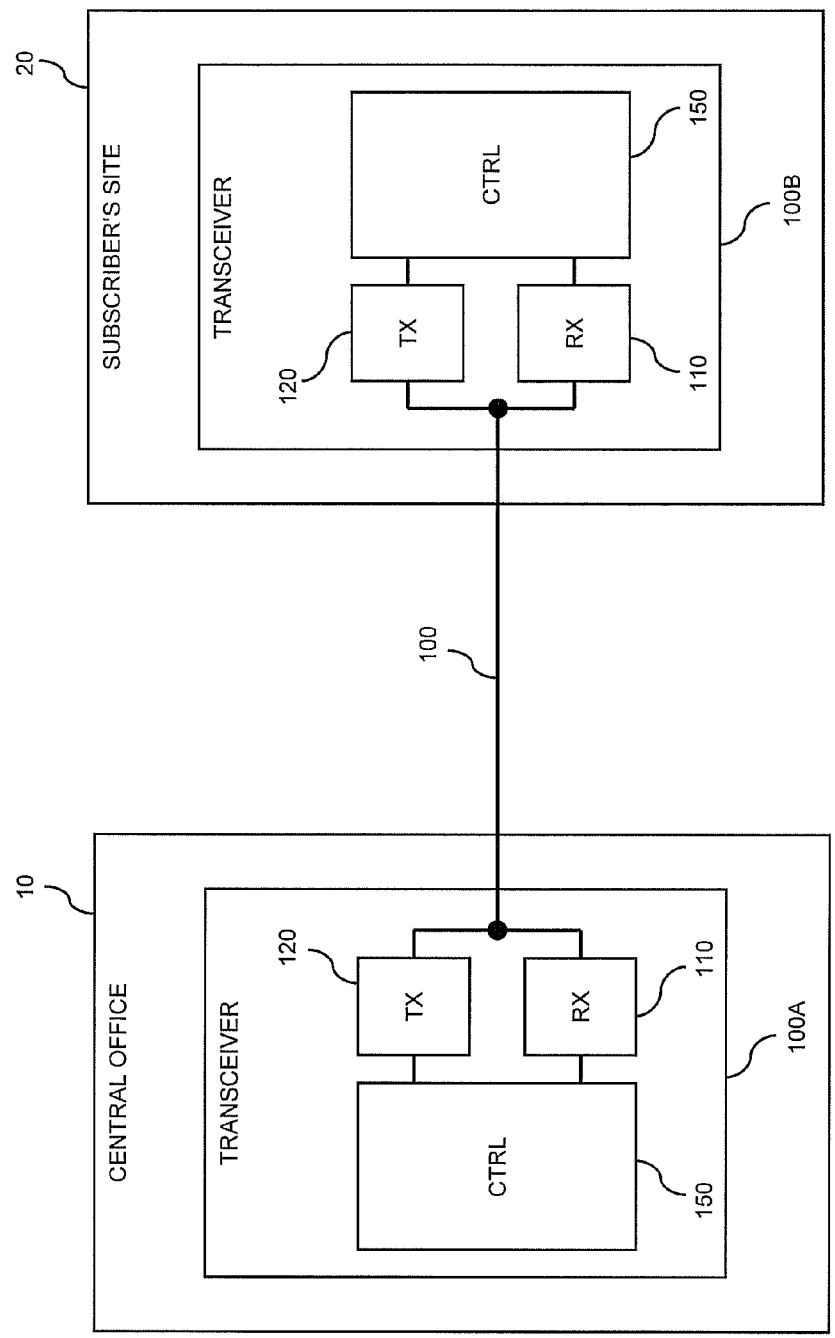
FIG. 1 schematically illustrates a communication system according to an embodiment of the invention.

FIG. 1 schematically illustrates a communication system according to an embodiment of the invention. The communication system of FIG. 1 is implemented as a DSL system and comprises a first transceiver 100A located in a central office 10 and a second transceiver 100B located at a subscriber's site 20. The first transceiver 100A may also be referred to as a central office transceiver, and the second transceiver 100B may also be referred to as a subscriber transceiver. The first transceiver 100A and the second transceiver 100B are coupled to each other by a physical communication media 100, in the following also referred to as physical media. In a typical DSL communication system, the physical media 100 is formed by a twisted pair copper line. Nonetheless, it is to be understood that concepts as described hereinafter could also be applied to other types of communication systems, e.g. communication systems using other types of physical communication media such as coaxial line or wireless communication media.

The first transceiver 100A may be a part of a DSL modem in the central office 10. Similarly, the second transceiver 100B may be a part of a DSL modem at the subscriber's site 20. As a matter of course, further components may be provided at the central office 10 or at the subscriber's site 20, such as communication line cards, DSL splitters, user terminals, or the like.

As illustrated in FIG. 1, the first transceiver 100A and the second transceiver 100B have a substantially similar configuration and each comprise a receive (RX) section 110 and a transmit (TX) section 120. The RX section 110 and the TX 120 are coupled to the physical media 100. This may be accomplished using a hybrid (not shown). In a typical DSL implementation, the RX section 110 and the TX section 120 will use different portions of a signal transmission bandwidth of the physical media 100. For example, a communication signal transmitted in a downstream direction from the TX section 120 in the central office 10 to the RX section 110 at the subscriber's site 20 may use an upper portion of the available transmission bandwidth, whereas communication signals transmitted in an upstream direction from the TX section 120 at the subscriber's site 20 to the RX section 110 at the central office 10 may use a lower portion of the available transmission bandwidth. According to some embodiments, e.g. in implementations of the communication system according to the ADSL2 specification, the portion of the available bandwidth allocated to the downstream direction is larger than the portion of the available bandwidth allocated to the upstream direction.

As further illustrated, each of the transceivers 100A, 100B comprises a controller (CTRL) 150 coupled to the RX section 110 and to the TX section 120. The controller 150 has the purpose of controlling operations of the RX section 110 and/or of the TX section 120. In particular, according to some embodiments of the invention, the controller 150 has the purpose of initiating transition between different power modes of the transceivers 100A, 100B.

In the exemplary implementation of FIG. 1, each of the transceivers 100A, 100B comprises both receiving and transmitting capabilities. Accordingly, the transceivers 100A, 100B may also be regarded as a receiver and/or a transmitter. Also, it is to be understood that other implementations of the communication system may use separated receivers and transmitters or may use only a transmitter at one end of the physical media 100 and a receiver at the other end of the physical media.

Figure 2:
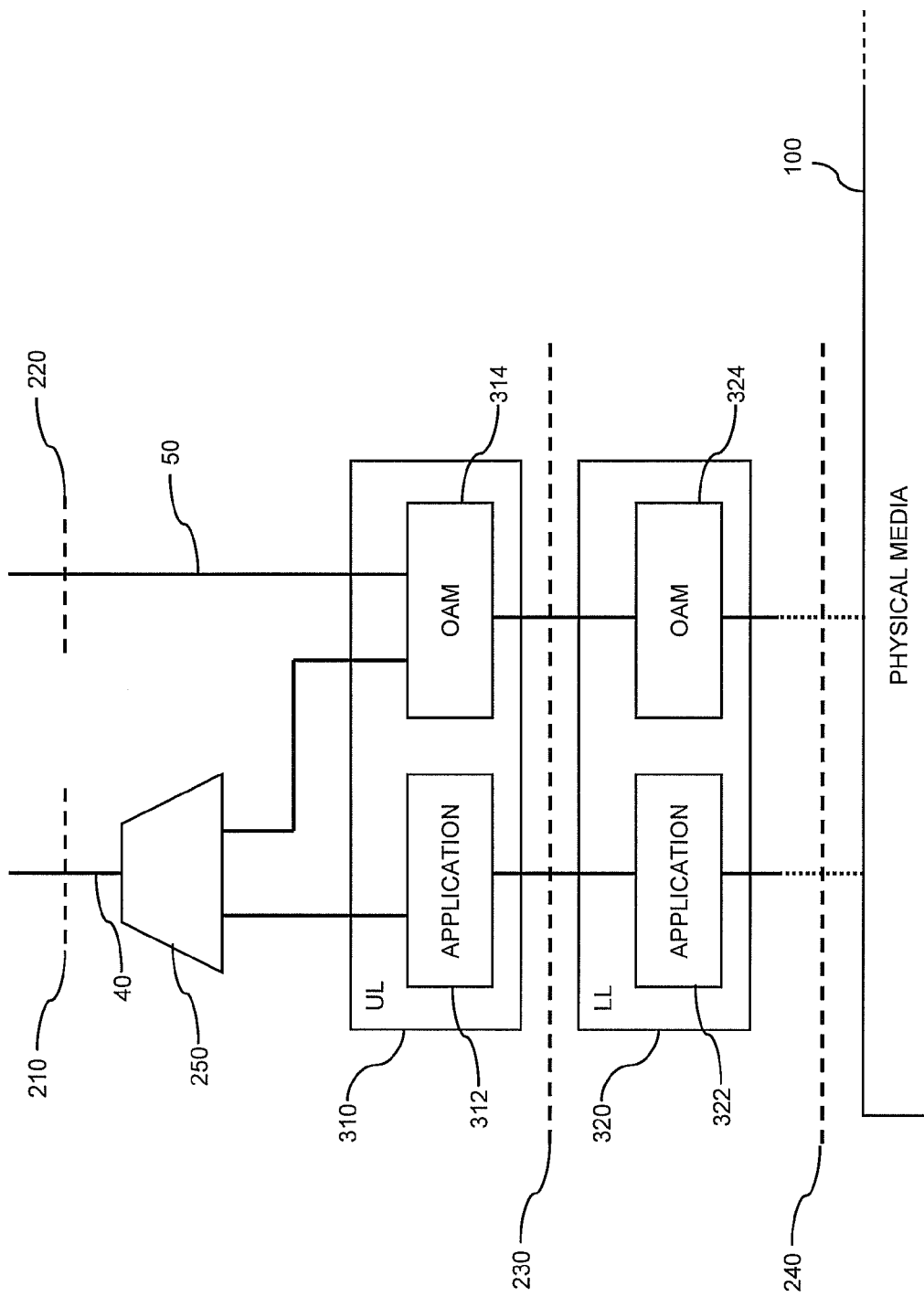
FIG. 2 schematically illustrates a portion of a communication layer stack in a communication device according to an embodiment of the invention.

FIG. 2 schematically illustrates a portion of a communication layer stack or protocol stack in a communication device according to an embodiment of the invention. The portion of the protocol stack as illustrated in FIG. 2 may be implemented in the RX section 110 and/or in the TX section 120 of the transceivers 100A, 100B as illustrated in FIG. 1.

As illustrated, communication layer stack of the communication device comprises an application data interface 210, and a physical media interface 240. The application data interface 210 has the purpose of receiving and/or transmitting application data 40. The application data 40 may include data of higher protocol layers and/or payload data of specific applications, such as VoIP applications. The application data 40 are communicated via an upper first communication layer (UL) 310 and a lower second communication layer (LL) 320. Between the upper communication layer 310 and the lower communication layer 320, an inter-communication layer interface 230 may be provided.

As further illustrated, the communication device also comprises an operation, administration, and maintenance (OAM) data interface 220. The OAM data interface 220 is configured to receive and/or transmit OAM data 50. The OAM data 50 are communicated between the OAM data interface 220 and the physical media interface 240 via the upper communication layer 310 and the lower communication layer 320. In embodiments having the inter-communication layer interface 230, the OAM data 50 are thus also communicated over the inter-communication layer interface 230.

The physical media interface 240 has the purpose of receiving and/or transmitting a communication signal including the application data 40 and/or the OAM data 50 with respect to the physical media 100. For example, in the case of transmit operation, the application data 40 may be modulated onto corresponding signal tones of the communication signal, and the OAM data 50 may be modulated onto corresponding signal tones of the communication signal. In the case of receive operation, the application data 40 may be demodulated from corresponding signal tones of the communication signal, and the OAM data 50 may be demodulated from corresponding signal tones of the communication signal. The communication signal 100 transmitted on the physical media may thus include both the application data 40 and the OAM data 50, which are transmitted on different signal tones of the communication signal.

The communication layers 310, 320 may be any communication layers in a communication layer stack, e.g. according to the OSI reference model (OSI: Open Systems Interconnection). According to an embodiment, the communication layers 310, 320 may be different sublayers of the physical link layer. However, in other embodiments the communication layers 310, 320 may also be other types of communication layers. Also, it is to be understood that FIG. 2 may actually only be a portion of the entire communication layer stack. That is to say, further communication layers may be provided above the communication layer 310, 320 or below the communication layers 310, 320. According to one embodiment, the communication layer 320 is the lowest communication layer or lowest sublayer and directly coupled to the physical media via the physical media interface 240.

As further illustrated, the upper communication layer 310 comprises a first entity 312 for processing the application data 40 and a second entity 314 for processing the OAM data 50. Similarly, the lower communication layer 320 comprises a third entity 322 for processing the application data 40 and a fourth entity 324 for processing the OAM data 50. The first entity 312 may also be referred to as an application data entity of the upper communication layer 310, and the third entity 322 may also be referred to as an application data entity of the lower communication layer 320. Similarly, the second entity 314 may be referred to as an OAM data entity of the upper communication layer 310, and the fourth entity 324 may be referred to as an OAM entity of the lower communication layer 320. The first entity 312 and the second entity 314 may accomplish any type of processing of their respective input data as required according to the communication layer 310. For example, the first entity 312 may provide for scrambling, descrambling, frame generation, or frame synchronization as required for application data 40. Similarly, the second entity 314 may provide for scrambling, descrambling, frame generation, and/or frame synchronization as required for the OAM data 50. In addition, the second entity 314 may also provide for OAM message generation. According to an embodiment, the second entity 314 is configured to provide encapsulation/decapsulation of data into OAM messages, e.g. according to HDLC (High-Level Data Link Control).

The third entity may provide for clock generation, clock regeneration, coding, decoding, modulation, demodulation, echo compensation, link setup or the like for the application data 40, whereas the fourth entity 324 may provide for clock generation, clock regeneration, coding, decoding, modulation, demodulation, echo compensation, link setup or the like for the OAM data 50. Some of these functions of the third entity 322 and of the fourth entity 324 may be jointly implemented for the application data 40 and for the OAM data 50, e.g. clock generation or clock regeneration. Other functions, such as coding, decoding, modulation, or demodulation may be separately implemented.

As further illustrated, the communication device additionally comprises a switching device 250. The switching device 250 is coupled between the application data interface 210 and the upper communication layer 310. The switching device 250 is configured to selectively couple the application data interface 210 either to the first entity 312 or to the second entity 314 of the upper communication layer 310. Specifically, in a first power mode, the switching device 250 forwards the application data 40 between the application data interface 210 and the first entity 312 of the upper communication layer 310. The first entity 312 of the upper communication layer 310 is in turn coupled to the physical media interface 240 via the third entity 322 of the lower communication layer 320. In the first power mode, an application data path is thus established between the application data interface 210 and the physical media 100 which extends via the first entity 312 of the upper communication layer 210 and the third entity 322 of the lower communication layer 320. This application data path may be configured for transmitting the application data 40 with a high throughput, e.g. using a large bandwidth.

Regarding the OAM data 50, these are communicated between the OAM data interface 220 and the physical media interface 240 via the second entity 314 in the upper communication layer 310 and the fourth entity 324 in the lower communication layer 320. Here, it is to be understood that the OAM data 50 may also be locally generated within the upper communication layer 310 or the lower communication layer 320. According to an embodiment, the OAM data 50 are communicated using OAM messages. The OAM messages may carry additional data, which may be encapsulated into the OAM messages, e.g. using HDLC encapsulation.

In the second power mode, the switching device 250 forwards the application data 40 between the application data interface 210 and the second entity 314 of the upper communication layer 310. Application data 40 to be transmitted may then be encapsulated into OAM messages by the second entity 314. Similarly, received application data 40 may be decapsulated from OAM messages by the second entity 314. In the second power mode, an OAM data path is used for transmitting the application data 40. The OAM data path extends between the application data interface 210 and the physical media interface 240 via the second entity 314 of the upper communication layer 310 and the fourth entity 324 of the lower communication layer 320. In the second power mode, the first entity 312 of the upper communication layer 310 and the third entity 322 of the lower communication layer 320 are bypassed.

Bypassing the first entity 312 of the upper communication layer 310 and/or the third entity 322 of the lower communication layer 320 in the second power mode allows for reducing power consumption since there is no load on the first entity 312 of the upper communication layer 310 and the third entity 322 of the lower communication layer 320. According to an embodiment, the first entity 312 of the upper communication layer 310 and/or the third entity 322 of the lower communication layer 320 may be switched off or operated at reduced power.

According to an embodiment, switching between the first power mode and the second power mode may be initiated according to a rate of the application data 40. For example, if the rate of the application data 40 decreases below a threshold value, switching from the first power mode to the second power mode may be initiated, e.g. by the controller 150 as illustrated in FIG. 1. If in turn the rate of the application data 40 increases above a threshold value, switching from the second power mode into the first power mode may be initiated, e.g. by the controller 150. Switching between the second power mode and the first power mode may also be initiated if capacities for encapsulating the application data 40 in OAM messages are not sufficient.

As mentioned above, according to an embodiment the upper communication layer 310 and the lower communication layer 320 may correspond to different sublayers of the physical link layer. In such an embodiment, the upper communication layer 310 may correspond to a Physical Media Specific Transmission Convergence (PMS-TC) sublayer, and the lower communication layer 320 may correspond to a Physical Media Dependent (PMD) sublayer, e.g. as defined in the ADSL2 specification ITU-T G.992.3 or in the VDSL2 specification ITU-TG.993.2. In such embodiments, the first entity 312 and the second entity 314 of the upper communication layer 310 may correspond to different latency paths of the PMS-TC sublayer. In the PMD sublayer, bit loading of the application data 40 and of the OAM data 50 may be accomplished in such a way, that a signal tone is either used for application data 40 or for OAM data 50. That is to say, the third entity 322 and the fourth entity 324 of the lower communication layer 320 may then correspond to functions and/or components for transmitting or receiving data bits from corresponding signal tones of the communication signal.

Figure 3:
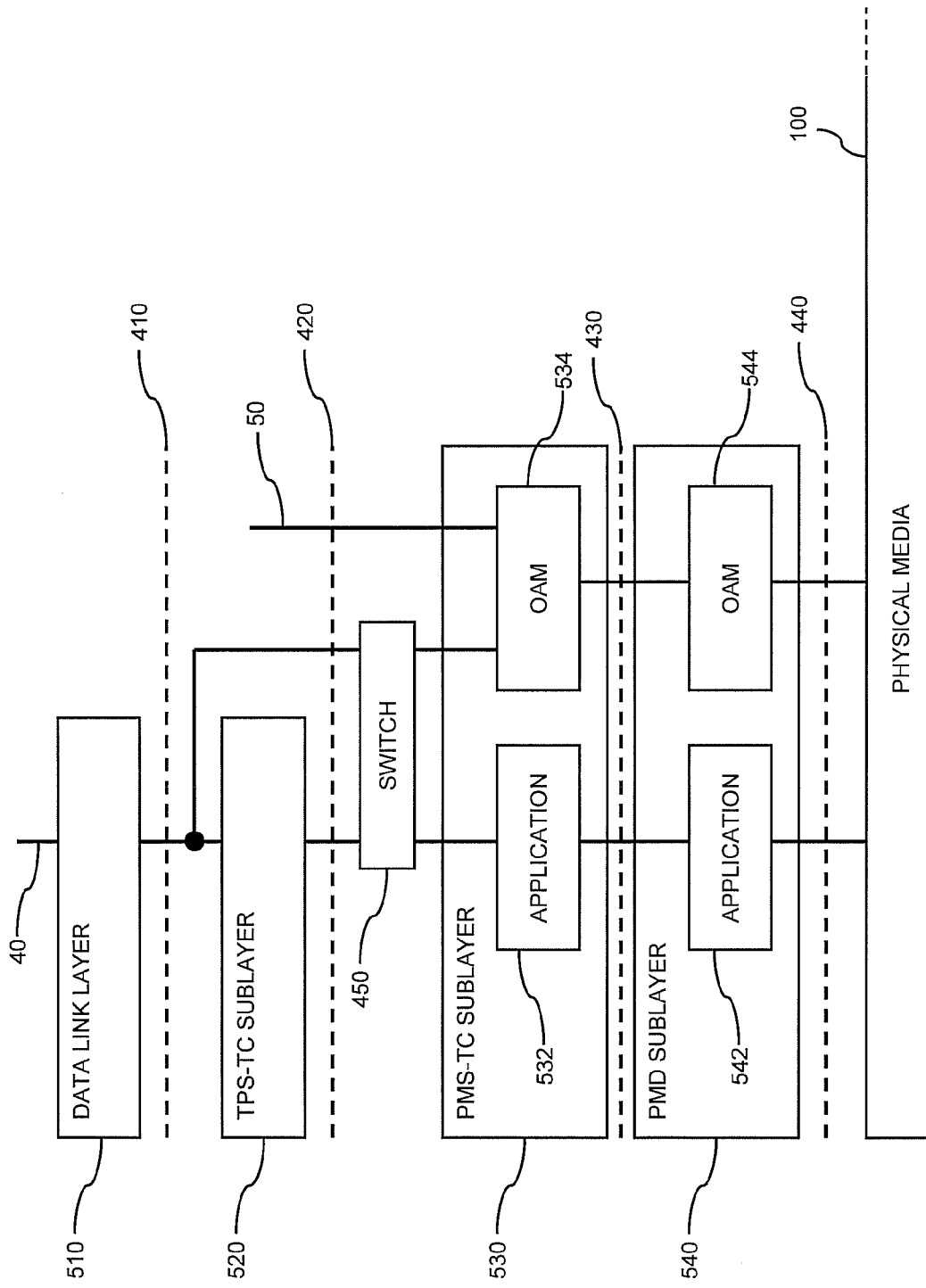
FIG. 3 schematically illustrates a portion of a communication layer stack in a communication device according to a further embodiment of the invention.

In the following, an embodiment will be explained in more detail which relates to a DSL implementation, e.g. according to the above-mentioned ADSL2 or VDSL2 specification. A portion of a protocol stack in a communication device of the DSL type is illustrated in FIG. 3. In the embodiment of FIG. 3, the protocol layer stack of the communication device comprises a data link layer 510, and a physical link layer including a TPS-TC sublayer 520, a PMS-TC sublayer 530, and a PMD sublayer 540. The PMS-TC sublayer 530, and the PMD 540 may substantially correspond to the upper communication layer 310 and the lower communication layer 320 in the communication layer stack of FIG. 2.

As further illustrated, the communication device corresponding to the embodiment of FIG. 3 comprises an application data interface 410 provided between the data link layer 510 and the TPS-TC sublayer 520, a first inter-communication layer interface 420 provided between the TPS-TC sublayer 520 and the PMS-TC sublayer 530, and a second inter-communication layer interface 430 provided between the PMS-TC sublayer 530 and the PMD sublayer 540. Further, a physical media interface 440 is provided between the PMD sublayer and the physical media 100.

As mentioned above, in the embodiment of FIG. 3 the communication device may correspond to a DSL communication device, e.g. according to the ADSL2 specification ITU-T G.992.3 or to the VDSL2 specification ITU-T G.993.2. In such embodiments, the data link layer may be an asynchronous transport mode (ATM) layer or other transport protocol. The application data interface 410 may then be a γ interface according to the above-mentioned specifications, i.e. a $γ_C$ interface in a central office transceiver according to the ADSL2 specification, a $γ_R$ interface in a subscriber transceiver according to the ADSL2 specification, a $γ_O$ interface in a central office transceiver according to the VDSL2 specification, or a $γ_R$ interface in a subscriber transceiver according to a VDSL2 specification. In a central office transceiver, the first inter-communication layer interface 420 may correspond to the α interface according to the above-mentioned specifications, and in a subscriber transceiver the first inter-communication layer interface 420 may correspond to the β interface according to the above-mentioned specifications. In a central office transceiver, the second inter-communication layer interface 430 may correspond to the $δ_C$ interface according to the ADSL2 specification or to the $δ_O$ interface according to the VDSL2 specification. In a subscriber transceiver, the second inter-communication layer interface 430 may correspond to the $δ_R$ interface according to the ADSL2 specification or according to the VDSL2 specification. The physical media interface 440 may correspond to the U interface according to the above-mentioned specifications.

Again, it is to be understood that the structure of the communication layer stack as illustrated in FIG. 3 is merely a portion of the communication layer stack and that further communication layers may be provided. In particular, additional higher layers may be provided above the data link layer 510.

In typical embodiments, the application data interface 410 of the communication device will be an internal interface provided between different communication layers, as illustrated in FIG. 3. However, in some embodiments, the application data interface 410 may also be an external interface of the communication device.

In the communication device according to the embodiment of FIG. 3, application data 40 to be transmitted are communicated via the data link layer 510, the application data interface 410, the TPS-TC sublayer 520, the first inter-communication layer interface 420, the PMS-TC sublayer 530, the second inter-communication layer interface 430, the PMD sublayer 540, and the physical media interface 440 to the physical media 100. Received application data 40 are communicated from the physical media 100 via the physical media interface 440, the PMD sublayer 540, the second inter-communication layer interface 430, the PMS-TC sublayer 530, the first inter-communication layer interface 420, the TPS-TC sublayer 520, the application data interface 410, and the data link layer 510. OAM data 50 to be transmitted may be communicated via the first inter-communication layer interface 420, the PMS-TC sublayer 530, the second inter-communication layer interface 430, the PMD sublayer 540, and the physical media interface 440 to the physical media 100. Received OAM data may be communicated from the physical media 100 via the physical media interface 440, the PMD sublayer 540, the second inter-communication layer interface 430, the PMS-TC sublayer 530, and the first inter-communication layer interface 420. However, it is to be understood that the OAM data 50 may also be generated and processed within the PMS-TC sublayer and need not be communicated via the first inter-communication layer interface 420.

For processing the application data 40, the PMS-TC sublayer 530 is provided with a first entity 532 which may be referred to as application data entity. For processing the OAM data 50, the PMS-TC sublayer 530 is provided with a second entity 534 which may be referred to as OAM data entity. The first entity 532 and the second entity 534 of the PMS-TC sublayer 530 may correspond to different latency paths, e.g. as described in the above-mentioned ADSL2 specification or VDSL2 specification.

The PMD sublayer 540 comprises a third entity 542, referred to as application data entity, for processing the application data 40 and a fourth entity 544, referred to as OAM data entity for processing the OAM data 50. According to some embodiments, the third entity 542 of the PMD sublayer 540 corresponds to functions or components of the PMD sublayer 540 for communicating data bits of the application data with respect to corresponding signal tones of the communication signal transmitted on the physical media 100. Similarly, the fourth entity 544 of the PMD sublayer 540 may correspond to functions or components of the PMD sublayer 540 for communicating data bits of the OAM data 50 with respect to corresponding signal tones of the communication signal transmitted on the physical media 100. That is to say, the third entity 542 and the fourth entity 544 may correspond to functions or components for communicating data bits with respect to different signal tones of the communication signal transmitted on the physical media 100.

Accordingly, in the embodiment of FIG. 3 the communication device provides an application data path for communicating the application data 40, which extends via the data link layer 510, the TPS-TC sublayer 520, the first entity 532 of the PMS-TC sublayer 530, and the third entity 542 of the PMD sublayer 540. For communicating the OAM data, the communication device provides an OAM data path which extends via a second entity 534 of the PMS-TC sublayer 530 and the fourth entity 544 of the PMD sublayer 540.

The functions of the communication layers and sublayers as illustrated in FIG. 3 may be as specified in the above-mentioned ADSL2 specification or VDSL2 specification. For example, the TPS-TC sublayer may provide functions of rate decoupling of the application data 40. The PMS-TC sublayer 530 may provide functions of scrambling, descrambling, frame generation, or frame synchronization. According to an embodiment, the second entity 534 for processing the OAM data 50 may also provide functions of encapsulating data into OAM messages, e.g. according to HDLC. The PMD sublayer 540 may provide functions of clock generation, clock regeneration, coding, decoding, modulation, demodulation, echo compensation, or link setup.

As further illustrated, the communication device according to the embodiment of FIG. 3 further comprises a switching device 450 (also referred to as switch), which is coupled between the application data interface 410 and the PMS-TC sublayer 530. In a first power mode, the switching device 450 couples the application data interface 410 to the first entity 532 of the PMS-TC sublayer 530. Therefore, the first power mode involves transmitting the application data on the application data path, i.e. via the TPS-TC sublayer 520, the first entity 532 of the PMS-TC sublayer 530 and the third entity 542 of the PMD sublayer 540. In a second power mode, the switching device 450 couples the application data interface 410 to the second entity 534 of the PMS-TC sublayer 530. The application data 40 are thus redirected to the OAM data path. In the second power mode, the TPS-TC sublayer 520, the first entity 532 of the PMS-TC sublayer 530, and the third entity 542 of the PMD sublayer 540 are bypassed. Accordingly, components of the TPS-TC sublayer 520, of the first entity 532 of the PMS-TC sublayer 530, and of the third entity 542 of the PMD sublayer 540 may be operated at reduced power or switched off. The second power mode may thus also be referred to as a reduced power mode.

In the first power mode, the application data 40 and the OAM data 40 may be transmitted via different latency paths, i.e. the first entity 532 and the second entity 534, of the PMS-TC sublayer. In the first power mode, the second entity 534 of the PMS-TC sublayer 530 is used exclusively for transmitting the OAM data 50. The OAM data path extending via the second entity 534 of the PMS-TC sublayer 530 may be protected against interferences with read Solomon coding and/or with interleaving.

In the second power mode, the second entity 534 of the PMS-TC sublayer may receive application data 40 to be transmitted from the application data interface 410 and encapsulate the application data 40 to be transmitted into OAM messages, e.g. using HDLC encapsulation. Received application data 40 may be decapsulated from OAM messages by the second entity 534 of the PMS-TC sublayer, e.g. using HDLC decapsulation.

As described above, embodiments of the invention therefore involve that in the first power mode the application data 40 are communicated via the dedicated application data path. In the second power mode, the application data 40 are redirected to be communicated on the OAM data path.

According to embodiments of the invention, transitions between the first power mode and the second power mode may be accomplished on the basis of the rate of the application data 40. That is to say, a transition from the first power mode to the second power mode may be initiated if the rate of the application data 40 decreases below a threshold value, e.g., 1,000 kBit/s. A transition from the second power mode to the first power mode may be initiated if the rate of the application data 40 increases above the threshold value. A transition from the second power mode to the first power mode may also be initiated if capacities for encapsulating the application data 40 in OAM messages are no longer sufficient.

In the following, exemplary procedures and processes in accordance with the above-mentioned structures of a communication device will be further explained. As mentioned above, these concepts involve that application data 40 and OAM data 50 are communicated via different entities of a sublayer, e.g. an application data entity and an OAM data entity of the PMS-TC sublayer. In other communication layers, e.g. in the PMD sublayer, a similar separation of entities for processing the application data 40 and the OAM data 50 may be provided. Accordingly, components for processing the application data 40 may be switched off if they are not used, without adversely affecting communication of the OAM data 50. Similarly, also components of higher communication layers, e.g. of the PMS-TC sublayer may be switched off if they are not needed.

If the rate of the application data 40 decreases below the given threshold value, the application data 40 may be redirected to be communicated via the OAM data entity of the sublayer, rather than being communicated via the application data entity. According to an embodiment, the redirection of the application data 40 may be accomplished after the rate of the application data 40 decreases below the threshold value for a certain time. In this way, frequent redirection of the application data 40 may be avoided if the rate of the application data 40 is close to the threshold value. Having redirected the application data 40 to the OAM data path, components of the application data path may be switched off, thereby allowing for efficient use of power resources. According to an embodiment, only control data of higher communication layers are included in the application data 40 transmitted or received in the second power mode.

In a state in which the application data 40 are communicated via the OAM data entity of the sublayer, a redirection of the application data 40 to the dedicated application data path may be initiated if the rate of the application data 40 increases above the given threshold value. In this case, components of the application data path may be successively switched on and the application data path may then again be used for communicating the application data 40.

According to some embodiments, a communication device on one end of a physical media 100, e.g. the central office transceiver 100A, and a communication device at the other end of the physical media 100, e.g. the subscriber transceiver 100B, may be simultaneously switched between the first power mode and the second power mode. According to an embodiment, this may be accomplished by using dedicated OAM messages communicated between the different communication devices, e.g. from the central office transceiver 100A to the subscriber transceiver 100B. According to some embodiments, a simultaneous transition between the first power mode and the second power mode may be coordinated by synchronization data, e.g. as used by the PMD sublayer 540.

According to some embodiments, the OAM messages may allow for encapsulating 1024 bytes of data, e.g. as defined in section 7.8.2.3 of ITU-T G.992.3. In such embodiments, data packets of the application data 40 having sizes up to 1024 bytes may be encapsulated into a single OAM message. For example, if the application data 40 comprises ATM cells of 53 bytes size, one or more ATM cells may be encapsulated into a single OAM message. In case of a larger data packet size of the application data 40, e.g. Ethernet packets of up to 1518 byte size, a data packet of the application data 40 may be segmented into multiple segments and encapsulated into multiple OAM messages. Alternatively, a size limitation for encapsulating data in the OAM messages may be modified or overridden for the purpose of encapsulating larger data packets in a single OAM message.

According to some embodiments, segmentation may be accomplished by using an additional information field in the encapsulated data. Using this information field, a receiver may reassemble the original data packet from the segmented data in multiple OAM messages. According to an embodiment, the additional information field may have a size of 8 bit, in which the four least significant bits may indicate the number of segments of a segmented data packet and the four most significant bits may indicate the position of a segment in a sequence of segments.

According to some embodiments, the OAM messages may have different priorities. For example, three different priorities may be defined, i.e. low, medium, and high. According to an embodiment, OAM messages including encapsulated application data 40 may be assigned a priority which is less than the highest priority, e.g. a medium priority. In this way, it can be avoided that the transmission of the application data 40 in the OAM messages delay high priority commands in other OAM messages.

According to an embodiment, specific commands may be defined for controlling the transitions between the first power mode and the second power mode. These commands may be transmitted in OAM messages of highest priority. According to some embodiments, transitions between the first power mode and the second power mode may also be accomplished on the basis of a specific synchronization symbol pattern communicated between the PMD sublayers of different communication devices.

It is to be understood, that the above concepts of power saving may be combined with other power saving concepts. Specifically, in both the first power mode and the second power mode, it is possible to additionally adjust the bitrate of the communication signal transmitted on the physical media 100, e.g. as accomplished in the L2 mode according to the above-mentioned ADSL2 specification or VDSL2 specification.

Figure 4:
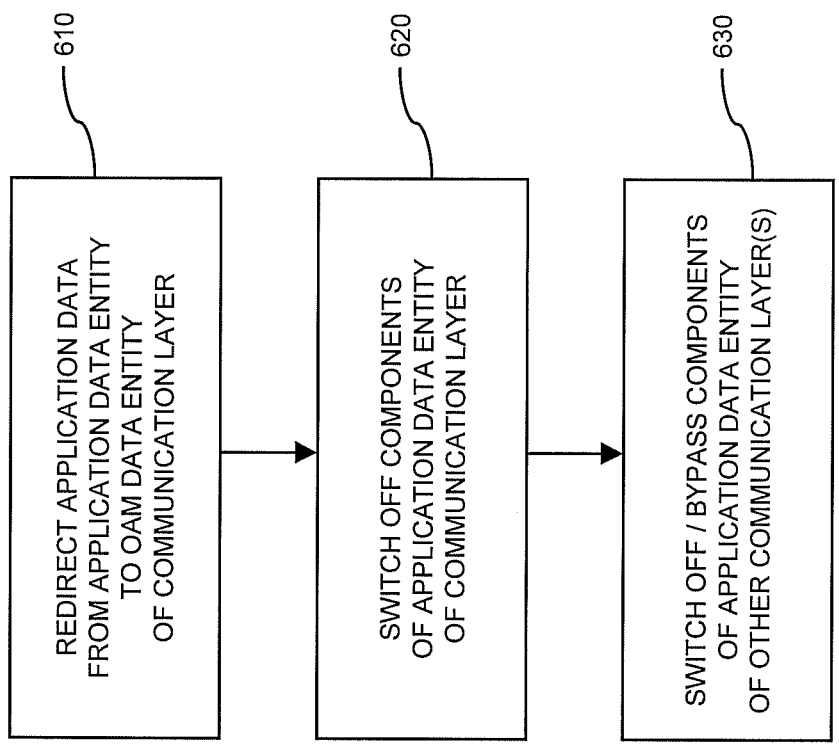
FIG. 4 shows a flow chart illustrating method steps of a power saving method according to an embodiment of the invention.

FIG. 4 schematically illustrates method steps in a power-saving method according to an embodiment of the invention. In particular, FIG. 4 illustrates method steps for transition from the first power mode to the second power mode. The method steps of FIG. 4 may be initiated in response to the rate of the application data 40 decreasing below a threshold value for a certain time of a communication layer.

In step 610, the application data 40 are redirected from the application data entity, e.g. the first entity 532 of the PMS-TC sublayer 530, to the OAM data entity, e.g. the second entity 534 of the PMS-TC sublayer 530.

In step 620, components of the application data entity, e.g. of the first entity 532 of the PMS-TC sublayer 530, are switched off. Alternatively, these components may be operated at reduced power.

In step 630, components for processing the application data 40 in other communication layers, e.g. the third entity 542 in the PMD sublayer 540 or the TPS-TC sublayer 510 may be switched off or bypassed.

Figure 5:
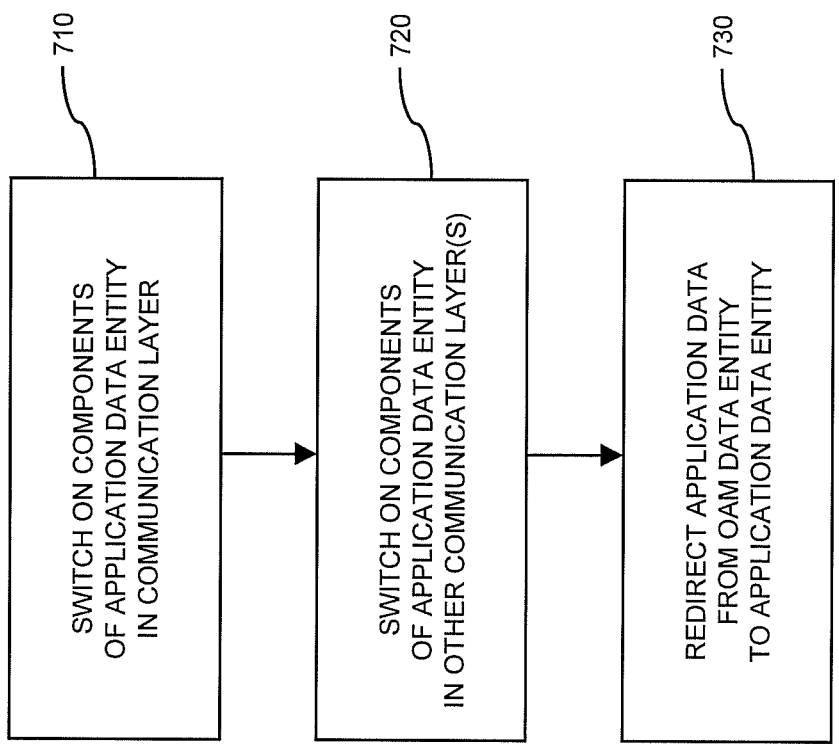
FIG. 5 shows a flow chart illustrating further method steps of a power saving method according to an embodiment of the invention.

FIG. 5 schematically illustrates method steps of a power saving method according to an embodiment of the invention. The method steps of FIG. 5 relate to a transition from the second power mode to the first power mode and may be appended to the method steps of FIG. 4, e.g. in response to the rate of the application data 40 increasing above a threshold value for a certain time.

In step 710, components of the application data entity in the communication layer, e.g. of the first entity 532 in the PMS-TC sublayer 530, are switched on. Alternatively, if these components have been brought into a reduced power mode, these components may also be fully repowered.

In step 720, components of entities for processing the application data 40 in other communication layers, e.g. components of the third entity 542 in the PMD sublayer 540 or of the TPS-TC sublayer 510 may be switched on. Alternatively, if these components have been brought into a reduced power mode, step 720 may also involve fully repowering these components.

In step 730, the application data 40 are redirected from the OAM data entity, e.g. the second entity 534 of the PMS-TC sublayer 530, to the application data entity, e.g. the first entity 532 of the PMS-TC sublayer 530 of the communication layer.

It is to be understood, that the arrangement of the method steps in FIGS. 4 and 5 is merely exemplary. According to other embodiments of the invention, the method steps may be arranged in a different order, certain method steps may be omitted, and/or certain method steps may be modified.

It is to be understood that the above-described embodiments and examples have been provided only for the purpose for illustrating the present invention. As will be apparent to the skilled person, the invention may be applied in a variety of different ways, which may deviate from the above-described embodiments. For example, the concepts as described above are not limited to ADSL2 communication devices or VDSL2 communication devices and may be applied to any type of communication device having different entities for processing application data and OAM data. Moreover, the concepts may be applied at different levels of the communication layer stack.

Terms such as "first", "second", and the like, are used herein to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A communication device, comprising:
an application data interface;
a first communication layer comprising a first entity configured to process application data and a second entity configured to process operations, administrations and maintenance data and the application data;
a switching device configured to switch between a first power mode and a second power mode, the switching device coupling the application data interface to the first entity in the first power mode, wherein the application data is transmitted by the first entity and the operations, administrations and maintenance data is transmitted exclusively by the second entity in the first power mode, and coupling the application data interface to the second entity in the second power mode, wherein the application data and the operations, administrations and maintenance data are transmitted exclusively by the second entity in the second power mode; and
a physical media interface configured to communicate a communication signal with the application data and/or the operations, administrations and maintenance data to a physical media.

2. The communication device according to claim 1, further comprising a controller configured to switch off the first entity in the second power mode.

3. The communication device according to claim 2, further comprising a second communication layer comprising a third entity configured to communicate the application data with the first entity of the first communication layer, wherein the controller is configured to switch off the third entity in the second power mode.

4. The communication device according to claim 3, wherein the switching device is configured to bypass the third entity in the second power mode.

5. The communication device according to claim 2, wherein the controller is configured to initiate a transition from the first power mode to the second power mode in response to a rate of the application data decreasing below a threshold value.

6. The communication device according to claim 2, wherein the controller is configured to initiate a transition from the second power mode to the first power mode in response to a rate of the application data increasing above a threshold value.

7. The communication device according to claim 2, wherein the controller is configured to selectively adjust a bitrate of the communication signal.

8. The communication device according to claim 1, wherein the second entity comprises an encapsulation device configured to encapsulate the application data in an operations, administrations and maintenance message.

9. The communication device according to claim 1, wherein the second entity comprises a decapsulation device configured to decapsulate the application data from an operations, administrations and maintenance message.

10. The communication device according to claim 1, wherein the first entity and the second entity are different latency paths of a Physical Media Specific Transmission Convergence sublayer.

11. A method of power saving in a communication device comprising an application data interface, a first communication layer with a first entity for processing application data and a second entity for processing operations, administrations and maintenance data and the application data, a switching device, and a physical media interface coupled to the application data interface via the first communication layer, the method comprising:
   switching, by the switching device, between a first power mode and a second power mode;
   coupling the application data interface to the first entity in the first power mode;
   transmitting the application data by the first entity and the operations, administrations and maintenance data exclusively by the second entity in the first power mode;
   coupling the application data interface to the second entity in the second power mode;
   transmitting the application data and the operations, administrations and maintenance data exclusively by the second entity in the second power mode; and
   communicating a communication signal with the application data and/or the operations, administrations and maintenance data via the physical media interface.

12. The method according to claim 11, comprising switching off the first entity in the second power mode.

13. The method according to claim 12, wherein the communication device comprises a second communication layer with a third entity, the method comprising:
   communicating the application data between the application interface and the physical media interface via the first entity and the third entity in the first power mode; and
   switching off the third entity and communicating the application data between the application interface and the physical media interface via the second entity in the second power mode.

14. The method according to claim 13, comprising bypassing the third entity in the second power mode.

15. The method according to claim 11, comprising initiating a transition from the first power mode to the second power mode in response to a rate of the application data decreasing below a threshold value.

16. The method according to claim 11, comprising initiating a transition from the second power mode to the first power mode in response to a rate of the application data increasing above a threshold value.

17. The method according to claim 11, comprising adjusting a bitrate of the communication signal.

18. The method according to claim 11, comprising encapsulating the application data in an operations, administrations and maintenance message in the second power mode.

19. The method according to claim 11, comprising decapsulating the application data of an application data signal from an operations, administrations and maintenance message in the second power mode.

20. The method according to claim 11, wherein the first entity and the second entity are different latency paths of a Physical Media Specific Transmission Convergence sublayer.

21. A transmitter, comprising:
   a Transport Protocol Specific Transmission Convergence (TPSTC) sublayer configured to provide application data to be transmitted on a physical medium;
   a Physical Media Specific Transmission Convergence (PMSTC) sublayer comprising a first latency path configured to process the application data signal from the TPSTC sublayer and a second latency path configured to process operations, administrations and maintenance data to be transmitted on the physical medium and the application data signal from the TPSTC sublayer;
   a Physical Media Dependent (PMD) sublayer comprising a first portion configured to receive the processed application data from the PMSTC sublayer and a second portion configured to receive the operations, administrations and maintenance data from the PMSTC sublayer;
   a switching device coupled to the first latency path and to the second latency path, the switching device being configured to switch between the first latency path and the second latency path, the switching device directing the application data to the first latency path and directing the operations, administrations and maintenance data exclusively to the second latency path in a first power mode and directing the application data and the operations, administrations and maintenance data exclusively to the second latency path in a second power mode; and
   a controller configured to switch off the first portion of the PMD sublayer in the second power mode.

22. The transmitter according to claim 21, wherein the controller is configured to switch off components of the first latency path in the second power mode and/or to switch off components of the TPSTC sublayer in the second power mode.

23. A receiver, comprising:
   a Physical Media Dependent (PMD) sublayer comprising a first portion configured to receive an application data signal from a physical medium and a second portion configured to receive an operations, administrations and maintenance signal from the physical medium;
   a Physical Media Specific Transmission Convergence (PMSTC) sublayer comprising a first latency path configured receive data symbols of the application data signal from the PMD sublayer and a second latency path configured to process the operations administrations and maintenance data received from the PMSTC sublayer;
   a Transport Protocol Specific Transmission Convergence (TPSTC) sublayer configured to receive the processed application data from the PMSTC sublayer;
   a switching device coupled between the PMSTC sublayer and the TPSTC sublayer, the switching device being configured to switch between the first latency path and the second latency path, the switching device forwarding the application data from the first latency path and the operations, administrations and maintenance data exclusively from the second latency path in a first power mode and forwarding the application data and the operations, administrations and maintenance data exclusively from the second latency path in a second power mode; and
   a controller configured to switch off the first portion of the PMD sublayer in the second power mode.

24. The receiver according to claim 23, wherein the controller is configured to switch off components of the first latency path in the second power mode and/or to switch off components of the TPSTC sublayer in the second power mode.

* * * * *